(12) United States Patent
Ho et al.

(10) Patent No.: US 8,175,034 B2
(45) Date of Patent: May 8, 2012

(54) CONFIGURATION TECHNIQUES FOR WIRELESS COMMUNICATIONS DEVICES

(75) Inventors: Alex Ho, Cupertino, CA (US); Isabel Mahe, Los Altos, CA (US); Wen Zhao, San Jose, CA (US); Edmond Leung, Cupertino, CA (US); Gurunath Ramaswamy, San Diego, CA (US); Richard Curtis Scott, Vista, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 751 days.

(21) Appl. No.: 11/932,695

(22) Filed: Oct. 31, 2007

(65) Prior Publication Data

US 2009/0109871 A1 Apr. 30, 2009

(51) Int. Cl.
*H04W 4/00* (2009.01)
(52) U.S. Cl. ............... 370/328; 455/418; 455/435.2
(58) Field of Classification Search .......... None
See application file for complete search history.

(56) References Cited

U.S. PATENT DOCUMENTS

| | | | |
|---|---|---|---|
| 6,223,042 B1 * | 4/2001 | Raffel ............... | 455/455 |
| 6,976,253 B1 | 12/2005 | Wierman et al. | |
| 6,980,794 B1 * | 12/2005 | Hamada et al. ........... | 455/407 |
| 7,062,259 B1 | 6/2006 | Dispensa et al. | |
| 2002/0154632 A1 | 10/2002 | Wang et al. | |
| 2003/0058884 A1 * | 3/2003 | Kallner et al. ........... | 370/465 |
| 2003/0161288 A1 * | 8/2003 | Unruh .................. | 370/338 |
| 2004/0242209 A1 * | 12/2004 | Kruis et al. ............. | 455/414.1 |
| 2006/0030315 A1 * | 2/2006 | Smith et al. ............. | 455/432.3 |
| 2006/0223516 A1 | 10/2006 | Fan et al. | |
| 2007/0220157 A1 * | 9/2007 | Gattu et al. ............. | 709/230 |

FOREIGN PATENT DOCUMENTS

| | | |
|---|---|---|
| WO | 2009059009 A2 | 5/2009 |
| WO | 2009059009 A3 | 5/2009 |

OTHER PUBLICATIONS

Examination Report, European Application No. 08843632.4, Date: Dec. 8, 2011, pp. 1-3.

* cited by examiner

*Primary Examiner* — Jason Mattis
*Assistant Examiner* — James P Duffy

(57) ABSTRACT

Techniques for configuring wireless communications devices are disclosed. For instance, an apparatus may include a storage medium to store one or more configuration files, and a configuration module. Each of the one or more configuration files may correspond to a network carrier. The configuration module selects one of the configuration files and to extract one or more operational parameters from it. This selected configuration file and the one or more operational parameters correspond to a designated network carrier.

19 Claims, 4 Drawing Sheets

CONFIGURATION TECHNIQUES FOR WIRELESS COMMUNICATIONS DEVICES

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

Moreover, such devices may employ various wireless communications technologies (e.g., cellular, satellite, and/or mobile data networking technologies) to provide features, such as mobile telephony, mobile e-mail access, web browsing, and content (e.g., video and radio) reception.

In addition, devices may be configured to operate with networks provided by particular network carriers. One or more operational parameters may be associated with each network carrier. For instance, one network carrier may specify that its mobile devices employ a certain set of operational parameters, while another network carrier may specify a different set of operational parameters. Such differences among operational parameters may even exist when the carriers employ the same wireless networking system or technology.

Typically, a device is configured for a particular carrier before they are provided or sold to its user. Such configuration may be performed, for example, by the device manufacturer. Configuring a device may involve storing operational parameters within a storage medium (such as flash memory) of the device.

Sometimes, devices that are already configured need to be reconfigured for a different carrier. This may occur for various reasons. For instance, when device inventories for a first carrier become depleted, devices configured for a second carrier may be reconfigured in order to satisfy customer demand for devices that operate with the first carrier.

Prior techniques for configuring and reconfiguring devices involve manually updating operational parameters in an individual piecemeal manner. This is unfortunately tedious and consumes excessive amounts of time.

DETAILED DESCRIPTION

Various embodiments may be generally directed to techniques for configuring wireless communications devices. For instance, an apparatus may include a storage medium to store one or more configuration files, and a configuration module. Each of the one or more configuration files may correspond to a network carrier. The configuration module selects one of the configuration files and extracts one or more operational parameters from it. This selected configuration file and the one or more operational parameters correspond to a designated network carrier. Advantages may be obtained through such techniques. For instance, configuration and reconfiguration of devices may become more efficient.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment" or "in an embodiment" in various places in the specification are not necessarily all referring to the same embodiment.

Figure 1:
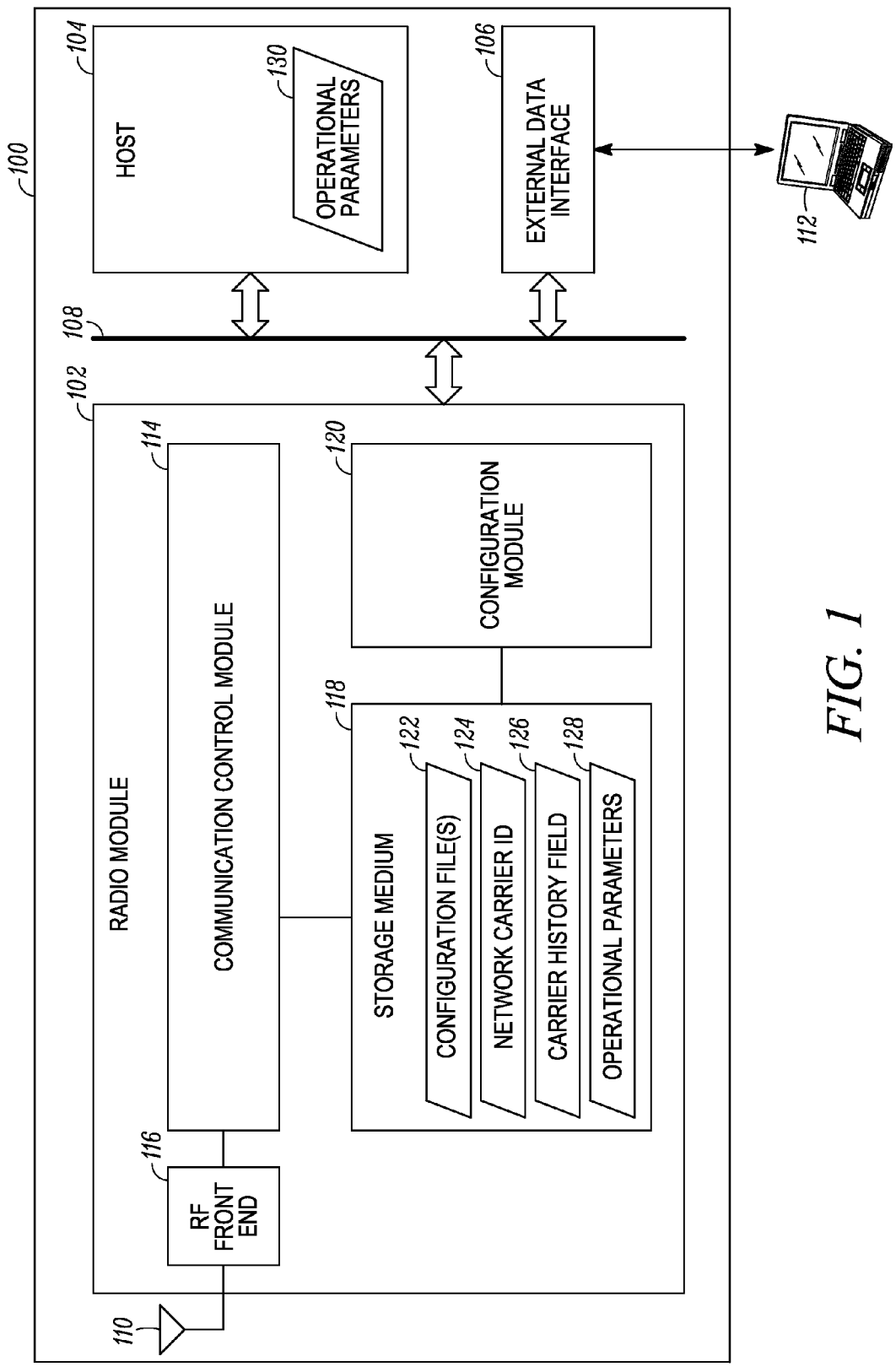
FIG. 1 illustrates an embodiment of an apparatus.

FIG. 1 illustrates an embodiment of an apparatus 100 that may engage in communications across wireless networks. FIG. 1 shows that apparatus 100 may include various elements. The embodiments, however, are not limited to these depicted elements. In particular, FIG. 1 shows that apparatus 100 may include a radio module 102, a host 104, an external data interface 106, an interconnection medium 108, and an antenna 110. These elements may be implemented in hardware, software, firmware, or in any combination thereof.

FIG. 1 shows that radio module 102 may include a communications control module 114, an RF front end 116, a storage medium 118, and a configuration module 120. Radio module 102 may communicate through one or more antennas (such as antenna 110) with remote devices (such as cellular base stations) across various types of wireless links. Such wireless links may be associated with various cellular systems and/or various wireless data networking systems.

Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA) systems, Narrowband Advanced Mobile Phone Service (NAMPS) systems, third generation (3G) systems such as Wide-band CDMA (WCDMA), CDMA-2000, Universal Mobile Telephone System (UMTS), cellular systems compliant with the Third-Generation Partnership Project (3GPP), various 4G systems, and so forth. The embodiments, however, are not limited to these examples.

Exemplary data networking systems include wireless local area network (WLAN) systems, such as IEEE 802.11 WiFi systems. Further examples include wireless metropolitan area (WMAN) systems, such as IEEE 802.16 WiMax systems and IEEE 802.16e WiBro systems. Yet further examples include WiMedia/Ultra Wide Band (UWB) systems (e.g., ones in accordance with Ecma International standards ECMA-368 and ECMA-369). Also, exemplary data networking links include personal area networks (PAN) systems such as Bluetooth, and WiBree (initially developed by Nokia Research Centre). The embodiments, however, are not limited to these examples.

Host 104 may perform operations associated with user applications. Exemplary user applications include telephony, text messaging, e-mail, web browsing, word processing, and so forth. Furthermore, host 104 may perform operations associated with one or more protocols (e.g., multiple protocols at various layers). Moreover, host 104 may provide one or more functional utilities that are available to various protocols, operations, and/or applications. Exemplary utilities include operating systems, device drivers, user interface functionality, and so forth.

Interconnection medium 108 provides for couplings among elements, such as radio module 102, host 104, and external data interface 106. Further, interconnection medium 108 may provide for the exchange of information among these elements.

Interconnection medium 108 may include one or more interfaces that provide for the exchange of information. Exemplary interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings. Such connections may comprise one or more signal lines. Moreover, interconnection medium 108 may include non-physical aspects. For instance, such interconnectivity may be implemented through messages passed between processes or software modules.

External data interface 106 allows apparatus 100 to exchange (e.g., send and/or receive) information with one or more external devices. This exchange of information may be across one or more wired connections. Examples of such connections include USB interfaces, parallel interfaces, and/or serial interfaces. In addition, external data interface 106 may provide for such exchanges across wireless connection(s). An infrared interface is an example of such a connection.

As shown in FIG. 1, external data interface 106 is coupled to interconnection medium 108. Therefore, through this coupling, external data interface 106 provides for external devices to exchange information with various components within apparatus 100, such as radio module 102 and host 104. However, the embodiments are not limited to these examples.

External data interface 106 may include various components, such as a transceiver and control logic to perform operations according to one or more communications protocols. In addition, external data interface 106 may include input/output (I/O) adapters, physical connectors to connect the I/O adapter with a corresponding communications medium.

The information exchanged with such external devices, may include information to be stored in storage medium 118. Additionally, this exchanged information may include e-mail, calendar entries, contact information, as well as other information associated with personal information management applications. In addition, such information may include various application files, and content (e.g., audio, image, and/or video).

As described above, radio module 102 includes communications control module 114, RF front end 116, storage medium 118, and configuration module 120. Also, as described above, these elements may be implemented in hardware, software, firmware, or any combination thereof RF front end 116 prepares signals generated by communications control module 114 for wireless transmission (e.g., via antenna 110). Additionally, RF front end 116 prepares received wireless signals for demodulation and processing by communications control module 114. RF front end 116 may include various components (e.g., electronics) such as amplifiers, filters, diplexers, and/or circulators. However, the embodiments are not limited to these examples.

Communications control module 114 provides for communications (via RF front end 116) with wireless networks. Accordingly, communications control module 114 may include a modem to modulate signals for wireless transmission and to demodulate received wireless signals. Also, communications control module 114 may include timing functionality to operate in accordance with network timing constructs, such as network time slots and/or transmission frames.

Additionally, communications control module 114 may process information received from remote network entities (such as base stations). For example, communications control module 114 may process received signals (e.g., pilot signals) to achieve network synchronization. Also, communications control module 114 may process received paging and/or signaling messages. Based on the reception of such messages, communications control module 114 may commence/terminate various communications, such as voice calls and/or sessions involving data communications. However, the embodiments are not limited to these examples.

In addition to communicating with wireless network entities (e.g., base stations), communications control module 114 may exchange information with host 104. This exchange may occur across interconnection media 108. For instance, communications control module 114 may exchange voice signals and data (e.g., Internet Protocol (IP) traffic) with host 104. Such voice signals and data correspond to signals exchanged wirelessly with remote network entities. Such remote network entities may include one or more base stations. However, the embodiments are not limited to this context.

Apparatus 100 may be configured for operation with a particular network carrier. This configuration may entail operational characteristics associated with or specified by the network carrier. In embodiments, such operational characteristics of apparatus 100 may be established by one or more configuration files stored in storage medium 118. These operational characteristics may be for one or more elements of apparatus 100. For example, the operational characteristics may be for communications control module 114, host 104, and/or RF front end 116. The embodiments, however, are not limited to these elements.

Various forms of information may be stored within storage medium 118. For instance, FIG. 1 shows storage medium 118 storing one or more configuration files 122, a network carrier identifier (ID) 124, a carrier history field 126, and one or more operational parameters 128.

Each of the one or more configuration files 122 provides an operational profile (also referred to as an operational image) for a corresponding network carrier. For example, each of configuration file(s) 122 may contain operational parameters for apparatus 100. Within a particular configuration file 122, some or all of these parameters may be specific to the corresponding network carrier. In embodiments, configuration file(s) 122 may be formatted as binary files. Such formats advantageously provide for the compact storage of information.

Network carrier ID 124 indicates a network carrier for which apparatus 100 is (or is to be) configured. This indicated network carrier is referred to herein as the designated network carrier. Network carrier ID 124 may be in the form of a numeric designator or a text string. However, other formats may be employed.

Carrier history field 126 indicates whether network carrier indicated by network carrier 112 is newly designated. For instance, a predetermined value of carrier history field 126 (e.g., a null value) indicates a newly designated network carrier. In embodiments, a newly designated network carrier is one that has been designated since operational power was last supplied to apparatus 100.

Operational parameters 128 may specify performance characteristics of communications control module 114. However, in embodiments, operational parameters 128 may specify performance characteristics of additional or alternative elements within apparatus 100. Examples of such elements include (but are not limited to) host 104 and RF front end 116.

In embodiments, operational parameters 128 may be stored in one or more character files (e.g., in one or more ASCII files). For example, operational parameters 128 may be stored in one or more header files that are accessed by control logic (e.g., software or firmware). Such control logic may be executed by one or more processing entities (e.g., microprocessors and/or microcontrollers). Such processing entities may be included in communications control module 114 and/or host 104. However, such processing elements may be included in other elements.

Storage medium 118 may be implemented in various ways. For example, storage medium 118 may be implemented with flash memory. However, the embodiments are not limited to such implementations. Further examples of storage media implementations are provided below with reference to FIG. 4.

Configuration module 120 may extract operational information from configuration file(s) 122. For instance, configuration module 120 may generate and store operational parameters 128 within storage medium 118.

Additionally or alternatively, configuration module 120 may extract operational parameters that are stored by other elements within apparatus 100. For instance, FIG. 1 shows that host 104 may store one or more operational parameters 130 in a storage (not shown). This storage medium may be associated with and/or included within host 104. Operational parameters 130 may specify performance characteristics of host 104.

FIG. 1 shows that apparatus 100 may interact with an external device 112. This interaction may be through external data interface 106. In embodiments, external device 112 may store configuration file(s) 122 within storage medium 118. Accordingly, external device 112 may be a computing device (e.g., a desktop or laptop computer) that stores one or more configuration files that may be loaded into wireless devices. Each of these configuration files may correspond to a particular network carrier. For example, configuration files may correspond to particular CDMA2000 network carriers. However, as described above, the embodiments are not limited to this type of wireless network.

In general operation, apparatus 100 may be configured based on information stored in storage medium 118. For instance, external device 112 may store configuration file(s) 122. In addition, external device 112 may set values for network carrier ID 124 and carrier history field 124. Based on these settings, apparatus 100 may configure or reconfigure itself. This configuration or reconfiguration may be performed upon the occurrence of one or more conditions, such as the application of operational power to apparatus 100.

As described herein, configuration files may contain various operational parameters. The values of some or all of these operational parameters may be dependent upon the designated network carrier. The operational parameters may be associated with various elements, such as radio modules and/or hosts. However, embodiments are not limited as such.

As examples, the operational parameters may specify wireless system settings, such as protocol versions, radio transmission and reception parameters, authentication key(s), and so forth. For instance, in the context of code division multiple access (CDMA) systems (e.g., CDMA2000 systems), such parameters may include NV values (non-volatile memory values) that specify wireless device operation. Additionally or alternatively, the operational parameters may include security parameters, mobile subscriber identity parameters, over-the-air parameter administration parameters, short message service (SMS) parameters, browser parameters (e.g., wireless access protocol (WAP) browser parameters), and/or location based service parameters. Also, the operational parameters may include short message service (SMS) and/or multimedia message service (SMS) parameters (e.g., message size limits, retry parameters, and so forth). The embodiments, however, are not limited to these examples.

As described above, the elements of FIG. 1 may be implemented in hardware, software, firmware, or any combination thereof. Thus, implementations may include one or more processors that execute instructions or control logic. In exemplary implementations, one or more processors may be associated with host 104, and one or more processors may be associated with radio module 102. The instructions or control logic may be stored in storage media (e.g., memory). Such storage media may further be included in apparatus 100 (e.g., storage medium 118). The embodiments, however, are not limited to such implementations.

Moreover, FIG. 1 provides an exemplary apparatus arrangement. Thus, the embodiments are not limited to this arrangement. For instance, information described herein may be stored by other storage media.

Figure 2:
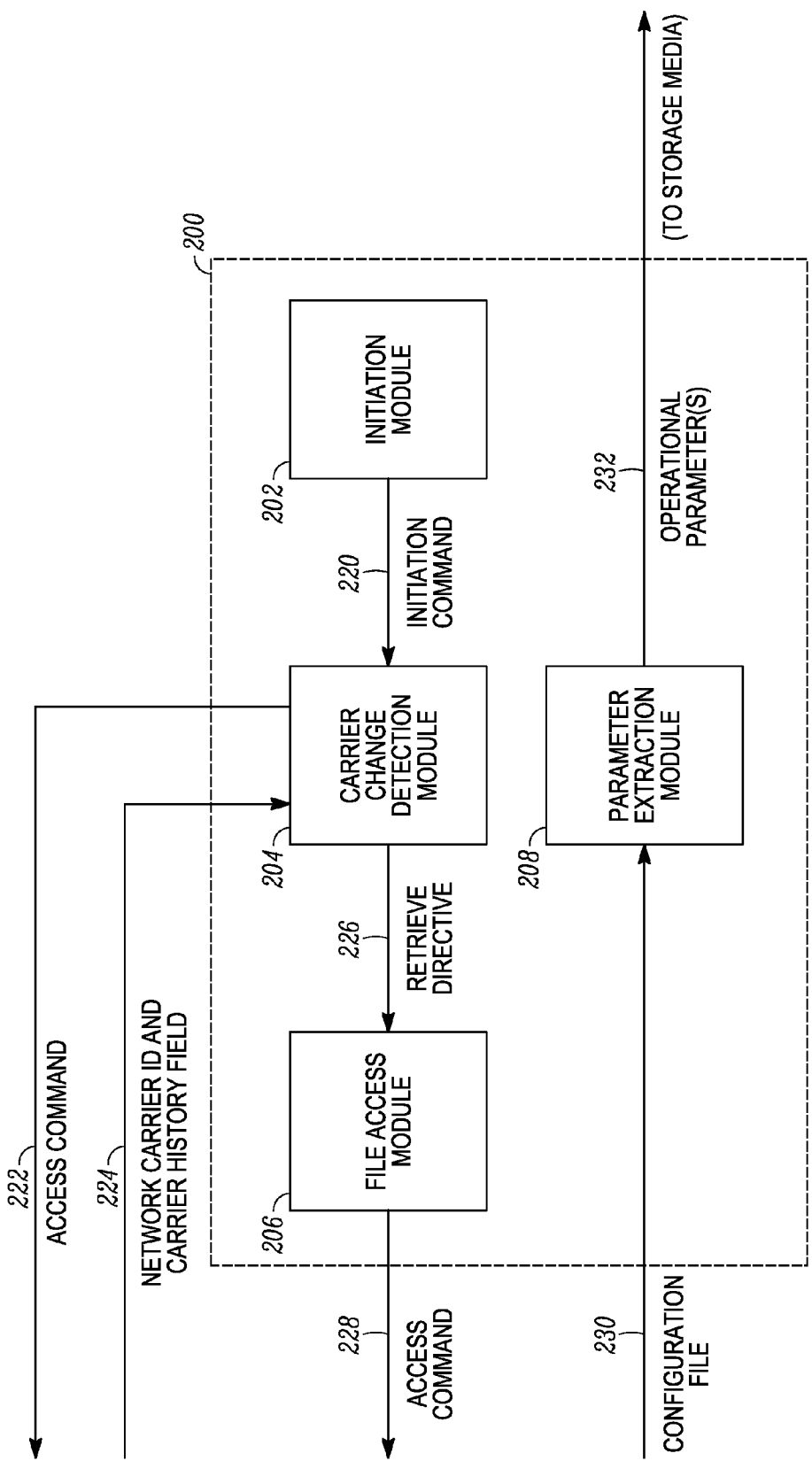
FIG. 2 illustrates an exemplary implementation embodiment.

FIG. 2 is a diagram of an exemplary implementation 200 that may extract operational parameters from configuration files. With reference to FIG. 1, this implementation may be included in configuration module 120. The embodiments, however, are not limited to this context.

Implementation 200 may include various elements. For example, FIG. 2 shows that implementation 200 may include an initiation module 202, a carrier change detection module 204, a file access module 206, and a parameter extraction module 208. These elements may be implemented in hardware, software, firmware, or any combination thereof FIG. 2 shows that initiation module 202 issues an initiation command 220 upon the occurrence of one or more conditions. Such condition(s) may include, for example, the application of operational power. However, the embodiments are not limited to this example.

Upon receipt of initiation command 220, carrier change detection module 204 determines whether there is a newly designated network carrier. As shown in FIG. 2, this may involve issuing an access command 222 to a storage medium (e.g., storage medium 118). In response to this command, carrier change detection module 204 receives information 224 from the storage medium indicating the status of the designated network carrier. For instance, in the context of FIG. 1, information 224 may include network carrier ID 124 and carrier history field 126.

Based on information 224, carrier change detection module 204 determines whether there is a newly designated network carrier. For example, this may involve determining whether carrier history field 126 indicates a recent change in the designated network carrier (e.g., a change since the last application of operational power). If such a change is detected, then carrier change detection module 204 generates a retrieve directive 226. This directive may indicate a configuration file corresponding to the designated network carrier.

Based on retrieve directive 226, file access module 206 issues an access command 228 to the storage medium (e.g., storage medium 118). In response, parameter extraction module 208 receives the corresponding configuration file 230. With reference to FIG. 1, this configuration file may be one of configuration file(s) 122.

Parameter extraction module 208 obtains one or more operational parameters 232. In turn, these parameter(s) may be sent to various storage media for storage. For instance, in the context of FIG. 1, one or more of operational parameter(s) 232 may be sent to storage medium 118 for storage as operational parameters 128 and/or to host 104 for storage as operational parameters 130. The embodiments, however, are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
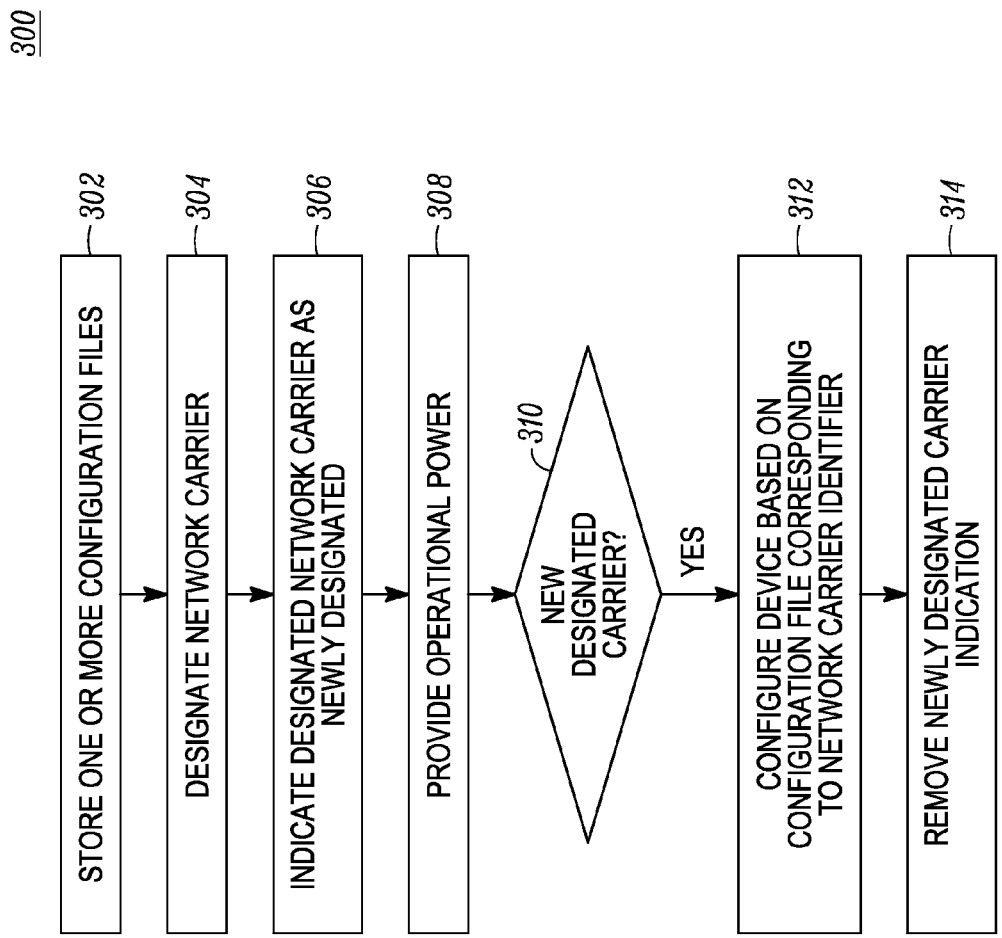
FIG. 3 is an exemplary flow diagram.

FIG. 3 illustrates one embodiment of a logic flow. In particular, FIG. 3 illustrates a logic flow 300, which may be representative of the operations executed by one or more embodiments described herein. Although various operations in this flow are described in the context of FIG. 1, the operations of FIG. 3 are not limited to this context.

As shown in FIG. 3, logic flow 300 includes a block 302. At this block, one or more configuration files (such as configuration file(s) 122) are stored. In the context of FIG. 1, these files may be stored in storage medium 118. Further, an external device may initiate storage of such configuration file(s). Referring again to FIG. 1, external device 112 may store such file(s) in storage medium 118 through external data interface 106.

At a block 304, a network carrier is designated. This designation corresponds to one of the configuration file(s) stored at block 302. With reference to FIG. 1, designating the network carrier may involve setting network carrier ID 124 to a particular value. This may be performed, for example, by external device 112 through external data interface 106.

The designated network carrier is indicated as being newly designated at a block 306. Thus, in the context of FIG. 1, this may involve setting carrier history field 126 to a predetermined value. This setting may be performed by external device 112.

At a block 308, operational power is applied. At this point, a block 310 determines whether the designated network carrier is newly designated. If so, then operation proceeds to a block 312.

At block 312, the device is configured based on a configuration file (e.g., a configuration file stored at block 302) corresponding to the designated network carrier identifier. This may involve extracting and storing one or more operational parameters from the configuration file. For example, such operational parameter(s) may be stored as operational parameter(s) 128 and/or operational parameters 130. As described above, these operational parameter(s) may specify device operation. For example, these operational parameters may specify operational characteristics of radio module 102 and/or host 104.

FIG. 3 shows that the newly designated indication for the designated network carrier is removed at a block 316. With reference to FIG. 1, this may involve setting carrier history field to a particular value. Thus, upon a further application of operational power, device reconfiguration will not occur unless a new network carrier designation is made.

In alternative embodiments, a newly designated network carrier can be automatically detected without a carrier history field containing a predetermined value to indicate a new designation. For instance, the carrier history field may contain the previously employed designated network carrier. Thus, block 310 may involve comparing the currently designated network carrier against a previous designated network carrier.

Figure 4:
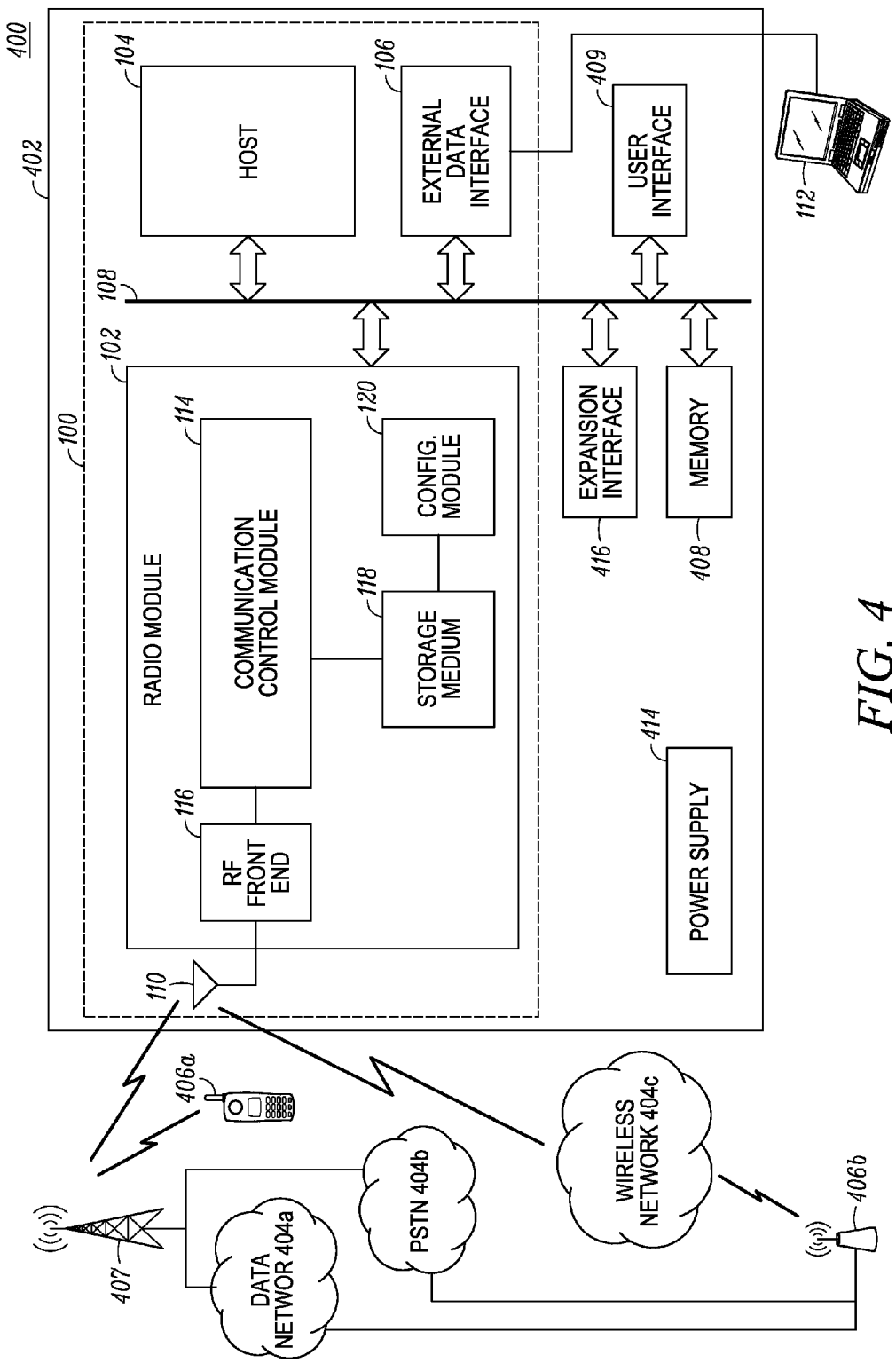
FIG. 4 illustrates an embodiment of a system.

FIG. 4 illustrates an embodiment of a system 400. This system may be suitable for use with one or more embodiments described herein, such as apparatus 100, implementation 200, logic flow 300, and so forth. Thus, system 400 may engage in wireless communications in accordance with the techniques described herein. In addition, system 400 may perform various user applications.

As shown in FIG. 4, system 400 may include a device 402 (e.g., a wireless handset, smartphone, etc.), multiple communications networks 404, and one or more remote devices 406. FIG. 4 shows that device 402 may include the elements of FIG. 1. However, device 402 may include the elements of other embodiments.

Also, device 402 may include a memory 408, a user interface 409, a power supply (e.g., a battery) 414, and an expansion interface 416. These elements may be implemented in hardware, software, firmware, or any combination thereof.

Power supply 414 provides operational power to elements of device 402. Accordingly, power supply 414 may include a battery. Such a battery may be rechargeable and/or removable. Alternatively or additionally, power supply 414 may include an interface to an external power source, such as an alternating current (AC) source. However, the embodiments are not limited to these examples.

Memory 408 may store information in the form of data. For instance, memory 408 may contain application documents, e-mails, sound files, and/or images in either encoded or unencoded formats. Also, memory 408 may store operational parameters 130, which are associated with host 104.

Alternatively or additionally, memory 408 may store control logic, instructions, and/or software components. These software components include instructions that can be executed by one or more processors. Such instructions may provide functionality of one or more elements. Exemplary elements include host 104, one or more components within radio module 102, and/or user interface 409.

Memory 408 may be implemented using any machine-readable or computer-readable media capable of storing data, including both volatile and non-volatile memory. For example, memory 408 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As described above, storage medium 118 may also be implemented with any of these exemplary media types.

It is worthy to note that some portion or all of memory 408 may be included in other elements of system 400. For instance, some or all of memory 408 may be included on a same integrated circuit or chip with elements of apparatus 100 and/or system 400. Alternatively some portion or all of memory 408 may be disposed on an integrated circuit or other medium, for example a hard disk drive, which is external. Also, in embodiments, some or all of storage medium 118 may be provided by memory 408. The embodiments are not limited in this context.

User interface 409 facilitates user interaction with apparatus 100. This interaction may involve the input of information from a user and/or the output of information to a user. Accordingly, user interface 409 may include one or more devices, such as a keyboard (e.g., a full QWERTY keyboard), a keypad, a touch screen, a microphone, and/or an audio speaker.

Expansion interface 416 may be in the form of an expansion slot, such as a secure digital (SD) slot. Accordingly, expansion interface 416 may accept memory, external radios (e.g., global positioning system (GPS), Bluetooth, WiFi radios, etc.), content, hard drives, and so forth. The embodiments, however, are not limited to SD slots. Other expansion interfaces or slot technologies may include memory stick, compact flash (CF), as well as others.

FIG. 4 shows that memory 408, external data interface 106, user interface 409, and expansion interface 416 may be coupled to radio module 102 and host 104 by interconnection medium 108.

FIG. 4 shows that device 402 may communicate wirelessly with a base station 407. As shown in FIG. 4, base station 407 may be coupled to a data network 404a (e.g., the Internet), and a public switched telephone network (PSTN) 404b. Further, base station 407 allows device 402 to communicate with various remote devices. For instance, FIG. 4 shows device 402 engaging in wireless communications (e.g., telephony or messaging) with a mobile device 406a.

As described above, embodiments may communicate across wireless links associated with various wireless data networking systems. Accordingly, FIG. 4 shows device 402 communicating with a wireless network 404c via an access point 406b. In turn, access point 406b may provide access to 404a and/or PSTN 404b. However, the embodiments are not limited to these examples.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a communications control module to exchange signals with one of a plurality of wireless network in accordance with one or more operational parameters, the plurality of wireless networks provided by a plurality of network carriers;
a storage medium to store a plurality of configuration files corresponding to the plurality of network carriers, the storage medium to include a network carrier history field to store a value indicating whether a newly designated wireless network carrier has been designated since operational power was last supplied to the apparatus, wherein a newly designated wireless network carrier is designated by storing a network carrier identification value within the storage medium; and
a configuration module to extract the one or more operational parameters from the configuration file associated with the newly designated wireless network.

2. The apparatus of claim 1, wherein the configuration module stores the one or more operational parameters in the storage medium.

3. The apparatus of claim 2, wherein the one or more operational parameters are stored in the storage medium as a header file.

4. The apparatus of claim 1, wherein the configuration module is to extract the one or more operational parameters from the configuration file upon the application of operational power.

5. The apparatus of claim 1, wherein the configuration module includes a parameter extraction module to extract the one or more newly designated operational parameters from the newly designated configuration file upon the application of operational power and an indication that the network carrier is newly designated.

6. The apparatus of claim 1, the configuration module including a carrier change detection module to detect a newly designated network carrier and to generate a retrieve command when said newly designated network carrier is detected, the retrieve command indicating a configuration file corresponding to the newly designated network carrier.

7. An apparatus, comprising:
a storage medium to store a plurality of configuration files, each configuration file corresponding to one of a plurality of network carriers, the storage medium to include a network carrier history field to store a value indicating whether a newly designated wireless network carrier has been designated since operational power was last supplied to the apparatus, wherein a newly designated wireless network carrier is designated by storing a network carrier identification value within the storage medium; and
a configuration module to select one of the plurality of configuration files and to extract one or more operational parameters from the selected configuration file;
wherein the selected configuration file and the one or more operational parameters correspond to a the newly designated wireless network carrier.

8. The apparatus of claim 7:
wherein the configuration module selects the selected configuration file when the network carrier history field indicates the designated network carrier is newly designated.

9. The apparatus of claim 8, the configuration module including a carrier change detection module to detect a newly designated network carrier and to generate a retrieve command when said newly designated network carrier is detected, the retrieve command indicating a configuration file corresponding to the newly designated network carrier.

10. The apparatus of claim 7:
wherein the configuration module selects the selected configuration file upon an application of operational power.

11. The apparatus of claim 7:
wherein the storage medium further comprises a communications control module to exchange signals with a wireless network in accordance with the one or more operational parameters.

12. A method comprising:
storing a plurality of configuration files, each of the configuration files corresponding to one of a plurality of wireless network carriers;
storing a network carrier history field to include a value indicating whether a newly designated wireless network carrier has been designated since operational power was last supplied to the apparatus;
establishing a newly designated wireless network carrier by setting a carrier identifier field to indicate the designated network carrier; and
configuring a wireless communications device based on one or more operational parameters from the configuration file associated with the newly designated network carrier.

13. The method of claim 12, wherein said configuring the device comprises extracting one or more operational parameters from the one configuration file.

14. The method of claim 13, wherein said configuring the device comprises storing the one or more operational parameters in a storage medium included in the device.

15. The method of claim 12, wherein said storing a plurality of configuration files comprises storing the plurality of configuration files within a storage medium included in the device.

16. The method of claim 12, using a carrier change detection module to detect a newly designated network carrier and generate a retrieve command when said newly designated network carrier is detected, the retrieve command indicating a configuration file corresponding to the newly designated network carrier.

17. An article, comprising a non-transitory machine-readable storage medium containing instructions that if executed enable a system to:
store a plurality of configuration files, each of the configuration files corresponding to one of a plurality of wireless network carriers;
store a network carrier history field to include a value indicating whether a newly designated wireless network carrier has been designated since operational power was last supplied to the apparatus;
establish a newly designated wireless network carrier by setting a carrier identifier field to indicate the designated network carrier; and
configure a wireless communications device based on one or more operational parameters from the configuration file associated with the newly designated network carrier.

18. The article of claim 17, wherein the non-transitory machine-readable storage medium contains instructions that if executed enable a system to indicate the designated network carrier as a newly designated network carrier.

19. The article of claim 17, wherein the non-transitory machine-readable storage medium contains instructions that if executed enable a system to detect a newly designated network carrier and generate a retrieve command when said newly designated network carrier is detected, the retrieve command indicating a configuration file corresponding to the newly designated network carrier.

* * * * *